Figure 1:
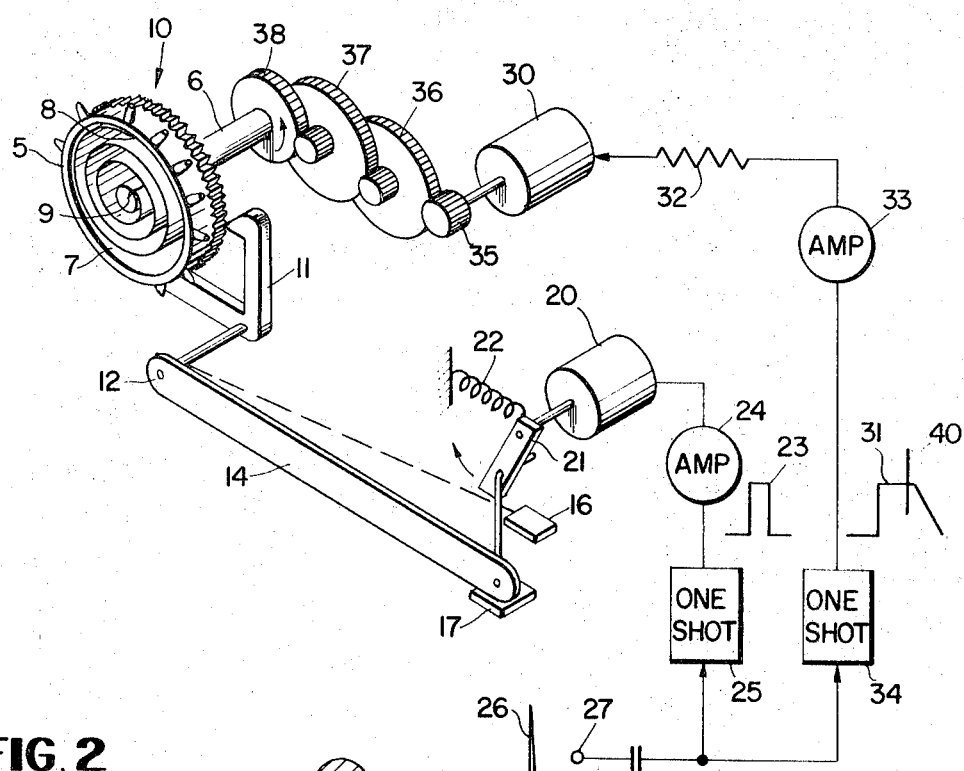

United States Patent

[11] 3,568,906

[72] Inventor John Paul Jones, Jr.
        Wayne, Pa.
[21] Appl. No. 831,191
[22] Filed June 6, 1969
[45] Patented Mar. 9, 1971
[73] Assignee Navcor, Inc., a Division of KDI Corporation
        Norristown, Pa.

[54] INCREMENTAL DRIVE SYSTEM FOR CODED TAPE
    7 Claims, 2 Drawing Figs.
[52] U.S. Cl. .................................................. 226/76,
                                                226/157, 74/1.5
[51] Int. Cl. ................................................... G03b 1/24
[50] Field of Search .......................................... 226/9, 157,
        76, 121, 169; 318/160; 185/40, 37; 74/(Expert)

[56] References Cited
        UNITED STATES PATENTS
2,460,000    1/1949    Flanagan ...................... 74/112(X)

3,316,769    5/1967    Nordin ........................    74/1.5

Primary Examiner—Richard A. Schacher
Assistant Examiner—Gene A. Church
Attorney—Laurence R. Brown ABSTRACT: A system is described for incrementally advancing coded tape in response to an electronic trigger signal by means of a sprocket drum driven by a DC motor of limited torque during a time period at which a current drive pulse of predetermined duration occurs. An energy storage spring is coupled between a motor driven shaft and the drum to absorb energy from the motor until a stall condition is reached, and an incremental ratchet mechanism confines the rotation of the drum to a predetermined angle for each motor driving pulse, thereby efficiently using a small amount of energy only during the advancing period. A second motor reciprocates the ratcheting mechanism during the period the drum motor is operated.

INVENTOR
JOHN PAUL JONES, JR.

BY Lawrence R. Brown

ATTORNEY

INCREMENTAL DRIVE SYSTEM FOR CODED TAPE

This invention relates to electronically operated drive systems for incrementally advancing coded tape sprockets, and more particularly it relates to means for operating an electric motor system to drive a sprocket for a predetermined distance in response to an electronic trigger pulse.

Sprocket drive devices for coded punch paper tape used in reading or punching operations are subjected to a multiplicity of specific requirements. They must be simple, inexpensive, rugged and reliable under various environmental conditions of temperature, humidity and vibration. In most instances the drive must be coordinated with electronic equipment of various sorts so that the drive devices must be ready to work asynchronously upon call at any instance an electronic trigger pulse is prepared by the electronic utilization system and a drive mechanism that must work at a particular time in a drive cycle is unacceptable since it slows down relatively complex and fast electronic systems.

Some applications exist in space probes and aircraft where power and size of tape drive units must be minimized. Thus any device requiring continuous power drain is unacceptable, and the size of power drive motors is critical.

Accordingly it is an object of this invention to provide improved and efficient incremental sprocket drive systems operable asynchronously from electronic trigger pulses.

A further object of the invention is to provide trigger pulse operated sprocket drive systems miniature in size presenting low power drain.

Yet another object of the invention is to provide electronically triggered incremental drive means for coded paper tape and the like that is rugged and reliable and contains few operating parts.

Therefore in accordance with the invention a tape sprocket is driven by a small DC motor of limited torque which is operated only when triggered. The motor is coupled to the sprocket by a storage spring that absorbs motor energy during a one shot rotation period ending when the motor load is exceeded and it stalls. A second motor is used in a one-shot rotation period for operating a ratchet mechanism on the sprocket to limit each drive cycle to an incremental movement of predetermined magnitude.

Figure 2:
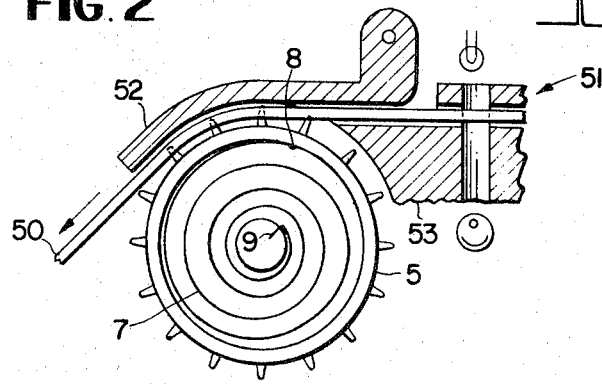

The various features and objectives of the invention are described in connection with a specific embodiment of the invention illustrated in the accompanying drawing, wherein:

FIG. 1 is a sketch in perspective of a sprocket drive system together with a one line schematic representation of the electronic drive means; and FIG. 2 is a fragmental elevation view, partly in section, of a coded tape processing system embodying the invention.

As may be seen in FIG. 1, a rotary sprocket drum member 5 is mounted to freely rotate on shaft 6 to the extent confined by the energy storing spiral spring 7 affixed at either end to the inner surface 8 of drum 5 and the outer surface 9 of shaft 6.

The sprocket drum includes a ratchet wheel 10 which is advanced by a double-acting click pawl mechanism 11 operated for rotation about pivot axis 12 by lever 14. Two pawls 15 at opposite ends of the V-shaped pawl mechanism member 11 each engage ratchet teeth on ratchet wheel 10 at opposite ends of a reciprocal stroke of lever 14 defined by top and bottom stops 16, 17. This is a standard pawl movement which operates to advance the ratchet wheel 10 (and drum 5 substantially half an incremental step upon part of the reciprocal stroke as lever 14 is lifted toward top stop 16 by the motor 20 through lever arm 21 and the other half as lever 14 is returned to rest position against bottom stop 17 by spring 22.

In this operation DC motor 20 is driven with a current pulse 23 from amplifier 24 that has fixed predetermined duration defined by the one shot multivibrator 25 whenever an electronic trigger pulse 26 arrives at advance pulse terminal 27. The drive pulse 23 is only applied when an actual incremental step is taken and thus is of a duration just long enough to assure a complete reciprocation of the lever 14. The DC motor therefore is of limited torque and is intermittently driven so that significant power can be obtained efficiently by a low torque rating, particularly since the ratchet mechanism alone is a light load and the motor may be overloaded in view of its low duty cycle of operation.

The trigger pulse 26 also drives the DC motor 30 of limited torque with a somewhat longer current pulse 31 overlapping pulse 23. Motor 30 has a current limiting resistor 32 passing current pulses 31 from amplifier 33 as shaped and timed by one shot multivibrator 34. Since motor 30 has a gear train 35-36-37-38, considerable drive power can be transmitted to shaft 6 and drum 5 from a very tiny motor of limited torque.

The motor 30 is purposely driven for a time period exceeding that required to rotate the drum 5 through one incremental step as indicated by line 40 on pulse 31. This permits the motor to wind up spiral spring 7 and store energy therein up to the stall position of motor 30, which will not become overheated or overloaded because of the low duty cycle of intermittent operation required.

Also the energy stored in spring 9 aids the advancement of drum 5 so that motor 30 is not working against a load when it starts the advance cycle, and thus a very small motor may be used with little energy required for performing the work task of moving the sprocket drum and the tape 50 it pulls (FIG. 2). The gear train 38-37-36-35 operates as an inertia braking device to prevent spiral spring 9 from unwinding between operation cycles.

In FIG. 2 it is seen that coded punch paper tape 50 may be pulled by sprockets on drum 5 past the photo electric reader station 51 in incremental steps positioning each set of coded holes in place successively as each electronic trigger pulse 26 is received from some external electronic utilization device such as a data processing system. Tape guide members 52, 53 are used together with other conventional tape processing means not shown.

Having therefore described an improved and efficient electronically triggered incremental drive system, features of novelty thereof are defined in the appended claims.

I claim:

1. An electrically actuated incremental drive system for advancing coded tape from one code position to the next comprising in combination, a drive shaft, a rotary drum member freely rotatable on said shaft, ratchet means coupled to said drum member for producing unitary incremental movements of the periphery of said drum member of a fixed predetermined distance, a spring member affixed said drum member, a DC motor predetermined of limited torque coupled to rotate said drum by medium of said spring, and an electronically controlled current source responsive to an electrical trigger pulse signal to meter a drive current into said motor of such duration that the motor tends to rotate the drum periphery a greater distance than said predetermined distance to thereby store energy in said spring until said limited torque is exceeded and the motor is stalled before said drive current expires.

2. A system as defined in claim 1 wherein the electronically controlled current source comprises a one shot multivibrator.

3. A system as defined in claim 1 wherein said motor is coupled to said shaft by a gear train which operates as a braking device to hold said shaft from rotation from the energy stored in said spring.

4. A system as defined in claim 1 wherein the ratchet means comprises a double-acting click mechanism with a lever operating two pawls against a ratchet wheel, each one of which moves the ratchet wheel part way in a reciprocal stroke to attain each said unitary incremental movement.

5. A system as defined in claim 4 wherein the lever operating the pawls is reciprocated by an electromagnetic device from a second drive current source delivering a current drive pulse of predetermined duration in response to said electrical trigger pulse within the period in which said drive current is supplied.

6. A system as defined in claim 4 wherein the electromagnetic device comprises a second motor of limited torque having a rotary shaft, means confining the rotation of said motor shaft to a predetermined angle from a rest position during the period in which said second drive current pulse is present, and biasing means returning said shaft and said lever to said rest position upon expiration of said second drive current pulse.

7. A system as defined in claim 1 wherein the rotary drum has sprockets about its periphery, and including means feeding a coded tape with sprocket holes for incremental positioning by said drum.